US008457821B2

(12) United States Patent
Shaffer (10) Patent No.: US 8,457,821 B2
(45) Date of Patent: Jun. 4, 2013

(54) SYSTEM AND METHOD FOR MANAGING ELECTRIC VEHICLE TRAVEL

(75) Inventor: Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 840 days.

(21) Appl. No.: 12/419,983

(22) Filed: Apr. 7, 2009

(65) Prior Publication Data
US 2010/0256846 A1 Oct. 7, 2010

(51) Int. Cl.
*G06F 7/00* (2006.01)

(52) U.S. Cl.
USPC ............... 701/22; 340/995.1; 340/995.14; 340/995.16; 340/995.23; 340/932.2; 180/65.8; 180/272; 180/287; 318/139; 318/272; 318/273; 464/147; 74/361; 701/123

(58) Field of Classification Search
USPC ............... 701/1, 22, 29, 200, 202, 209, 210, 701/123; 340/995.1, 995.14, 995.16, 995.23, 340/995.39, 932.2, 905; 180/65.8, 272, 287; 318/139, 272, 273; 464/147; 74/361
See application file for complete search history.

(56) References Cited

U.S. PATENT DOCUMENTS

| 5,790,976 | A | 8/1998 | Boll et al. | |
|---|---|---|---|---|
| 7,181,409 | B1 | 2/2007 | Murakami et al. | |
| 7,715,958 | B2 * | 5/2010 | Kumar | 701/22 |
| 7,747,739 | B2 * | 6/2010 | Bridges et al. | 709/224 |
| 7,801,651 | B2 * | 9/2010 | Iwers | 701/21 |
| 7,928,693 | B2 * | 4/2011 | Hafner et al. | 320/132 |
| 7,949,435 | B2 * | 5/2011 | Pollack et al. | 700/291 |
| 2002/0016667 | A1 | 2/2002 | Baur et al. | |
| 2002/0143464 | A1 | 10/2002 | Blewitt | |
| 2004/0263099 | A1 * | 12/2004 | Maslov et al. | 318/254 |
| 2005/0052080 | A1 * | 3/2005 | Maslov et al. | 307/10.1 |
| 2006/0005736 | A1 * | 1/2006 | Kumar | 105/1.4 |
| 2006/0005738 | A1 * | 1/2006 | Kumar | 105/35 |
| 2006/0129313 | A1 * | 6/2006 | Becker et al. | 701/202 |
| 2006/0259353 | A1 | 11/2006 | Gutmann | |
| 2007/0112475 | A1 * | 5/2007 | Koebler et al. | 701/1 |
| 2007/0282495 | A1 * | 12/2007 | Kempton et al. | 701/22 |

(Continued)

FOREIGN PATENT DOCUMENTS

| EP | A 275 936 B1 | 8/2008 |
|---|---|---|
| WO | WO 2010/117917 A1 | 10/2010 |

OTHER PUBLICATIONS

Cao et al. An Optimized EV Charging Model Considering TOU Price and SOC Curve, 2012, IEEE, pp. 388-393.*

(Continued)

*Primary Examiner* — McDieunel Marc
(74) *Attorney, Agent, or Firm* — Patent Capital Group (57) ABSTRACT

An apparatus is provided in one example embodiment and includes a power management module configured to receive data associated with travel being proposed by an end user of an electric vehicle. The power management module is configured to suggest a starting time for the travel based on time of use (ToU) rates for electricity consumption and a current level of power in the electric vehicle. In more specific embodiments, the data associated with the travel includes a starting location, an ending location, and a proposed drive time. In other embodiments, the power management module is further configured to interface with a mapping tool in suggesting the starting time for the end user. The power management module can be configured to obtain the ToU rates from a utility, and the ToU rates are provided as a function of time.

28 Claims, 3 Drawing Sheets

U.S. PATENT DOCUMENTS

| | | | | |
|---|---|---|---|---|
| 2008/0136371 | A1 | 6/2008 | Sutardja | |
| 2008/0270023 | A1* | 10/2008 | Kumar | 701/207 |
| 2009/0043520 | A1* | 2/2009 | Pollack et al. | 702/62 |
| 2009/0192702 | A1* | 7/2009 | Bourne | 701/200 |
| 2009/0212626 | A1* | 8/2009 | Snyder et al. | 307/10.1 |
| 2009/0222143 | A1* | 9/2009 | Kempton | 700/291 |
| 2011/0204717 | A1* | 8/2011 | Shaffer | 307/18 |

OTHER PUBLICATIONS

Song et al., A Rapid Charging Station with an Ultracapacitor Energy Storage System for Plug-In Electrical Vehicles, 2010, IEEE, p. 1-5.*

Zhao et al., A Research on Strategies for Construction of MAS-based Urban IT IS, 2009, IEEE, pp. 493-498.*

Willett Kempton and Steven E. Letendre, "Electric Vehicles as a New Power Source for Electric Utilities," http://www.udel.edu/V2G/docs/Kempton-Letendre-97.pdf, © 1997 Elsevier Science Ltd., 19 pages.

Rick Hornby et al., "Increasing Demand Response in Maine," http://www.synapse-energy.com/Downloads/SynapseReport.2008-01.ME-PUC.Increasing-Demand-Response-in-Maine.07-077.pdf, 2 pages (cover page and p. 5), Jan. 4, 2008.

California ISO: System Status, "Today's Outlook," http://www.caiso.com/outlook/outlook.html, 2 pages.

B.D. Williams, "Commercializing Light-Duty Plug-In/Plug-Out Hydrogen-Fuel-Cell Vehicles: 'Mobile Electricity' Technologies, Early California Household Markets, and Innovation Management," http://hydrogen.its.ucdavis.edu/people/bwilliams/Me-BWFinal.pdf, 2 pages (cover page and p. 60).

Roy Morrison, "Rising Sun for Electric Cars," http://www.policyinnovations.org/ideas/innovations/data/000039, © 2009, 3 pages.

PCT Notification of Transmittal (1 page) of the International Search Report (2 pages) and the Written Opinion of the International Searching Authority, or the Declaration (8 pages) mailed Sep. 17, 2010 for PCT/US2010/029885.

PCT Oct. 11, 2011 International Preliminary Report on Patentability from International Application No. PCT/US2010/029885; 9 pages.

EPO Nov. 30, 2011 Communication from European Application No. 10713400.9; 2 pages.

EPO Apr. 26, 2012 Response to EP Communication dated Nov. 30, 2011 from European Application No. 10713400.9; 9 pages.

Mongabay.com, "Plug-in cars could help fuel Austin power grid," Mar. 12, 2007, 8 pages; http://print.news.mongabay.com/2007/0326-wsj.html.

California ISO "Today's Outlook," [retrieved and printed from the Internet on Jan. 23, 2013], 1 page; http://www.caiso.com/outlook/outlook.html.

* cited by examiner

SYSTEM AND METHOD FOR MANAGING ELECTRIC VEHICLE TRAVEL

TECHNICAL FIELD OF THE INVENTION

This invention relates in general to the field of travel and, more particularly, to managing electric vehicle travel.

BACKGROUND OF THE INVENTION

Energy consumption has become increasingly important in today's society. As battery technology improves and as the cost of gas increases, an increased focus is being given to electric vehicles. Electric vehicles can reduce transportation costs, our dependency on foreign oil, green house gasses (GHG), and even global warming. For utility companies, electric vehicles present both an opportunity and a challenge. The opportunity lies in utilizing car batteries as a distributed storage for storing energy during times of low consumption. This distributed storage can also be used to smooth out the generation of intermittent renewable energies (e.g., wind and solar energy). The challenge lies in successfully coordinating these activities in an inexpensive manner. Thus, the ability to properly manage energy resources provides a significant challenge to automotive designers, component manufacturers, service providers, and system administrators alike.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An apparatus is provided in one example embodiment and includes a power management module configured to receive data associated with travel being proposed by an end user of an electric vehicle. The power management module is configured to suggest a starting time for the travel based on time of use (ToU) rates for electricity consumption and a current level of power in the electric vehicle. In more specific embodiments, the data associated with the travel includes a starting location, an ending location, and a proposed drive time. In other embodiments, the power management module is further configured to interface with a mapping tool in suggesting the starting time for the end user. The power management module can be configured to obtain the ToU rates from a utility, where the ToU rates are provided as a function of time. In addition, the power management module is further configured to identify at least one potential charging station for the electric vehicle to use during the travel.

Figure 1:
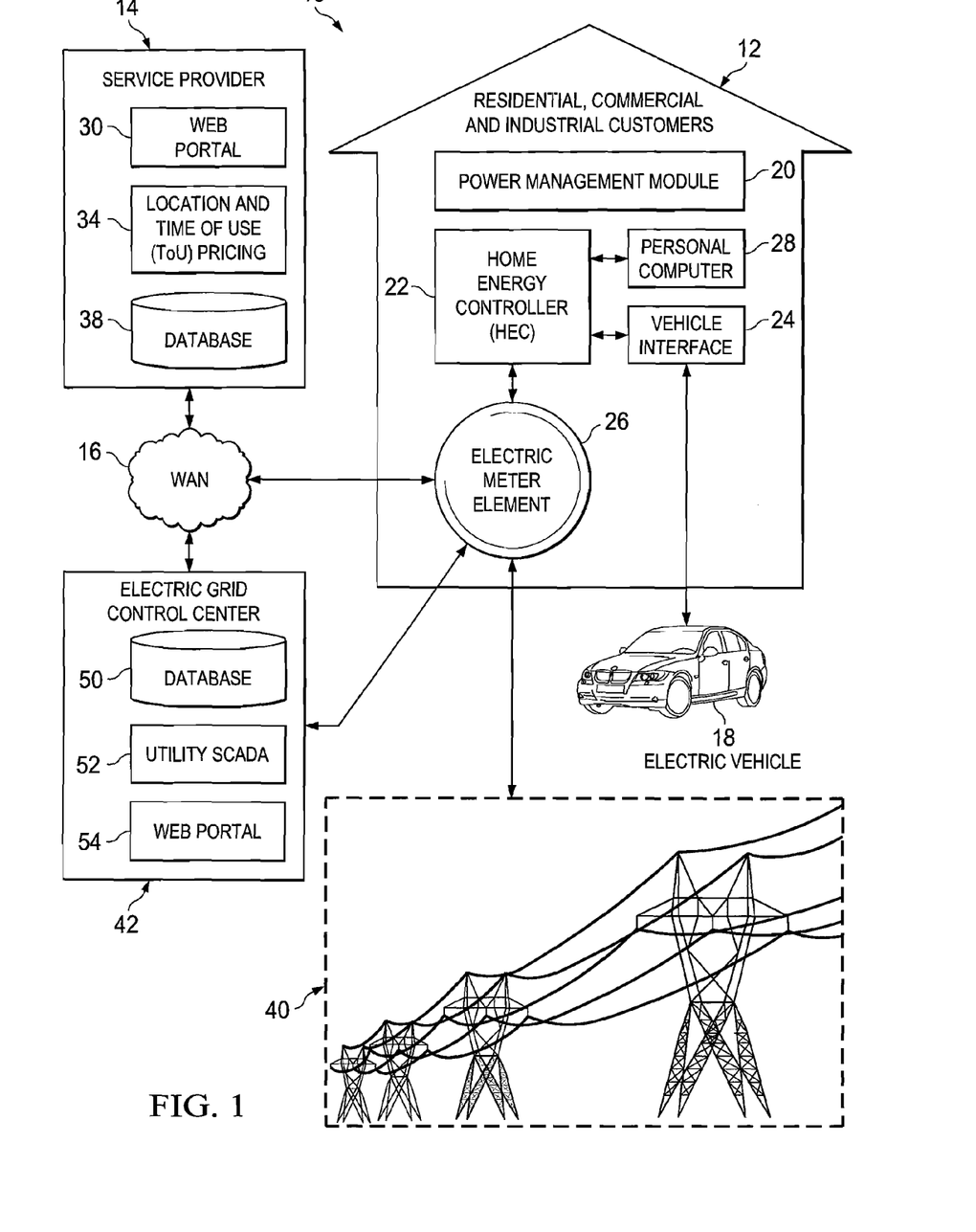
FIG. 1 is a simplified block diagram of a system for optimizing travel involving an electric vehicle in accordance with one embodiment.

Turning to FIG. 1, FIG. 1 is a simplified block diagram of a system 10 for optimizing travel involving an electric vehicle 18 in accordance with one embodiment. System 10 can include a residential, commercial, and industrial customers structure 12, and a service provider 14: both of which may leverage a wide area network (WAN) 16 for communication activities. Service provider 14 may include a web portal 30, a location and time of use [ToU] pricing element 34, and a database 38. Structure 12 may include a power management module 20, a home energy controller (HEC) 22, a vehicle interface element 24, an electric meter element 26, and a personal computer 28. Electric meter element 26 may be coupled to power lines and towers of the electric grid, which are generally illustrated at element 40. System 10 may also include an electric grid control center 42, which may include a database 50, a utility supervisory control and data acquisition (SCADA) element 52, and a web portal 54.

Each of the elements of FIG. 1 may couple to one another through simple interfaces or through any other suitable connection (wired or wireless), which provides a viable pathway for communications. Additionally, any one or more of these elements may be combined or removed from the architecture based on particular configuration needs. System 10 may include a configuration capable of transmission control protocol/internet protocol (TCP/IP) communications for the transmission or reception of packets in a network. System 10 may also operate in conjunction with a user datagram protocol/IP (UDP/IP) or any other suitable protocol or tunneling technique, where appropriate and based on particular needs.

In certain example embodiments, system 10 can guide end users on how to optimize their trip plans in order to reduce the transportation costs of electric vehicles. Indirectly, such architecture may also influence end user behavior to charge vehicles during off-peak demand periods. In operation of an example scenario, system 10 can identify power levels in an electric vehicle (e.g., via intelligence that leverages some type of network access) and offer suggestions for an ideal travel scenario. This could include minimizing energy costs for the specified travel, as further detailed below. Part of such a solution could involve identifying prospective locations that could be used for cost efficient recharging of electric vehicle 18. System 10 can minimize the cost of utilizing electric vehicle 18 by exploiting the non-linear characteristics of the ToU electricity rates, as could be offered by service provider 14.

Note that one challenge for utility companies lies in delivering energy being requested by owners of electric vehicles. Utilities are generally relegated the challenging task of purchasing energy from generation and transmission line companies. The task is challenging because power consumption is not consistent throughout the course of the day and is changing daily based on many factors. There is simply an uneven time-based demand for energy. For example, power consumption may be at its peak at 6 PM (e.g., when people are returning from work to their homes to start charging their electric vehicles, start air-conditioning systems, televisions, etc.), while minimal power consumption may be occurring at 3 AM (when most people are sleeping). Ideally, utilities would account for this variation such that consumers would consistently receive the requested energy at the selected time. Utilities should also be cognizant of simple supply and demand factors in order to coordinate power delivery in a cost-effective manner. Energy would most likely be at its most affordable levels during normal sleeping hours and at its highest levels during peak travel times (e.g., 6 PM to 7 PM). Many other factors such as availability of renewable energy may affect the availability of energy and as such the ToU rate.

In general terms, over a designated time interval, an average electric vehicle may consume as much energy as an average household. As such, if electric vehicles consume energy in an uncoordinated way, utilities may need theoretically to double their generation and transmission capacities. The cost of this proposition may be financially prohibitive. However, if 50% of the cars in the US were to be converted to electric vehicles and the charging of the cars were to be done in a coordinated manner, the existing generation stations and electric grid control center 42 would be able to satisfy the increased energy needs presented by electric vehicles.

The Smart Grid and Time of Use (ToU) electricity rate are envisioned to be the foundations for the utilities to satisfy the future energy needs of their customers. The process of using distributed vehicle batteries for powering the grid is referred to as Vehicle to Grid (V2G). Current mapping and navigation systems do not recognize the amount of gas in a given vehicle. For example, certain mapping interfaces (such as Google Maps, MapQuest, Yahoo Maps, etc.) may be used in order to identify an optimal route between two locations. Furthermore, these tools could be used to identify gas stations along the travel pathway. However, none of the systems account for an amount of gas in a vehicle being operated by the user. Additionally, no such system would allow this information to be combined with ideal refueling stations, which could be used by the end user before, during, or at the end of the trip.

In order to access some of the tools of system 10, a user interface may be configured in electric vehicle 18 (e.g., in the dashboard, provided as a plug-in device, connected to a GPS system of the electric vehicle), provided in personal computer 28, or provided as part of HEC 22. The user may be provided with a mapping tool such as MapQuest.com, Google Earth, Google Maps, Yahoo Maps, etc. to assist in mapping and planning their upcoming trips. In one example implementation, the interface is provided as part of power management module 20, and the mapping tool is offered by service provider 14, which can be readily accessed by power management module 20.

In accordance with one example embodiment, as a user enters his place of origin and destination, the system will automatically interact with the user's vehicle and obtain information regarding the electrical energy stored in the vehicle's battery. Vehicle interface 24 may interact with the elements in the car (for example) using a vehicle bus such as the Controller-Area Network (CAN or CAN-bus), which is a vehicle bus standard design that allows microcontrollers and devices to communicate with each other within a vehicle. Similarly, the system may obtain a specific vehicle's identification number using a CAN-bus. Based on this information, the system can determine the distance the vehicle can travel without needing to recharge. The system can also determine the optimal sites along the way for the user to recharge the vehicle's battery. Note that for existing gas or hybrid vehicles, MapQuest or Google Earth do not have access to information regarding the amount of gas/electric power in the tank or battery of a vehicle. The user interface (because it is potentially network based) can readily obtain other information such as weather, traffic, etc. The information is quickly accessible and this results in an easy user interface, where the incorporation of other data can be done in the background without burdened the user to enter data. Additional details relating to these activities are described below.

Returning to the infrastructure of FIG. 1, vehicle interface 24 can interface with electric vehicle 18 in order to recognize its current energy level. Electric vehicle 18 would typically be plugged into an outlet proximate to its residence, place of work, shopping center, or any other recharging location. HEC 22 can systematically become aware of electric vehicle 18, as well as other electric consuming devices, in monitoring and regulating energy levels for the residential, commercial, and industrial, and consumer locations (e.g., structure 12). Further, any suitable device can authenticate electric vehicle 18 (and various other electric devices) before reading their respective energy levels, or before charging a given device. Such an authentication could prevent theft, but it could also provide for more accurate consumption tracking for each specific device. Electric meter element 26 can readily interface with HEC 22 in order to provide current power levels to HEC 22. HEC 22 is configured to interact with personal computer 28 and vehicle interface 24 in example embodiments. Each of the components included in structure 12 can interact with each other using various interfaces, or these elements can be arranged differently or consolidated where one or more of the components are combined or eliminated. Many of these alternatives may be based on particular architecture needs and are certainly within the broad scope of the embodiments presented herein.

Service provider 14 represents an entity that offers information about the route between two points. This could be any of the aforementioned entities (Google, Yahoo, MapQuest, etc.) or any other entity that provides information related to travel. Such travel information can relate to weather conditions, traffic patterns, topography features, fueling (recharging) stations, etc. Note that any of these elements can be further analyzed as a function of time.

In one example embodiment, system 10 provides an electric vehicle management functionality, which facilitates a more cost effective use of electric vehicles. The functionality counterbalances an end user's electricity consumption such that it encourages energy consumption in times when the grid has sufficient energy reserves. Note that many systems assume that a user plans to travel at a specific time and a rather blunt software tool can readily outline an optimal route for that specific time. Beyond these activities, system 10 can leverage the paradigm shift associated with electric vehicles and ToU rates. With existing cars, when a user travels from point A to point B, the cost of fuel required for the trip is fixed (e.g., depending on the MPG efficiency of the car and the gas price at the local gas station). Users who attempt to optimize the cost of gas expenditures can use websites such as Gaspricewatch.com in order to find the cheapest gas in their location. System 10 acknowledges that, for electric vehicles, the cost of a trip from point A to point B depends on the electricity rate in affect when the user charges his vehicle. As illustrated below, this new paradigm offers a new layer of complexity for planning a trip.

Figure 2:
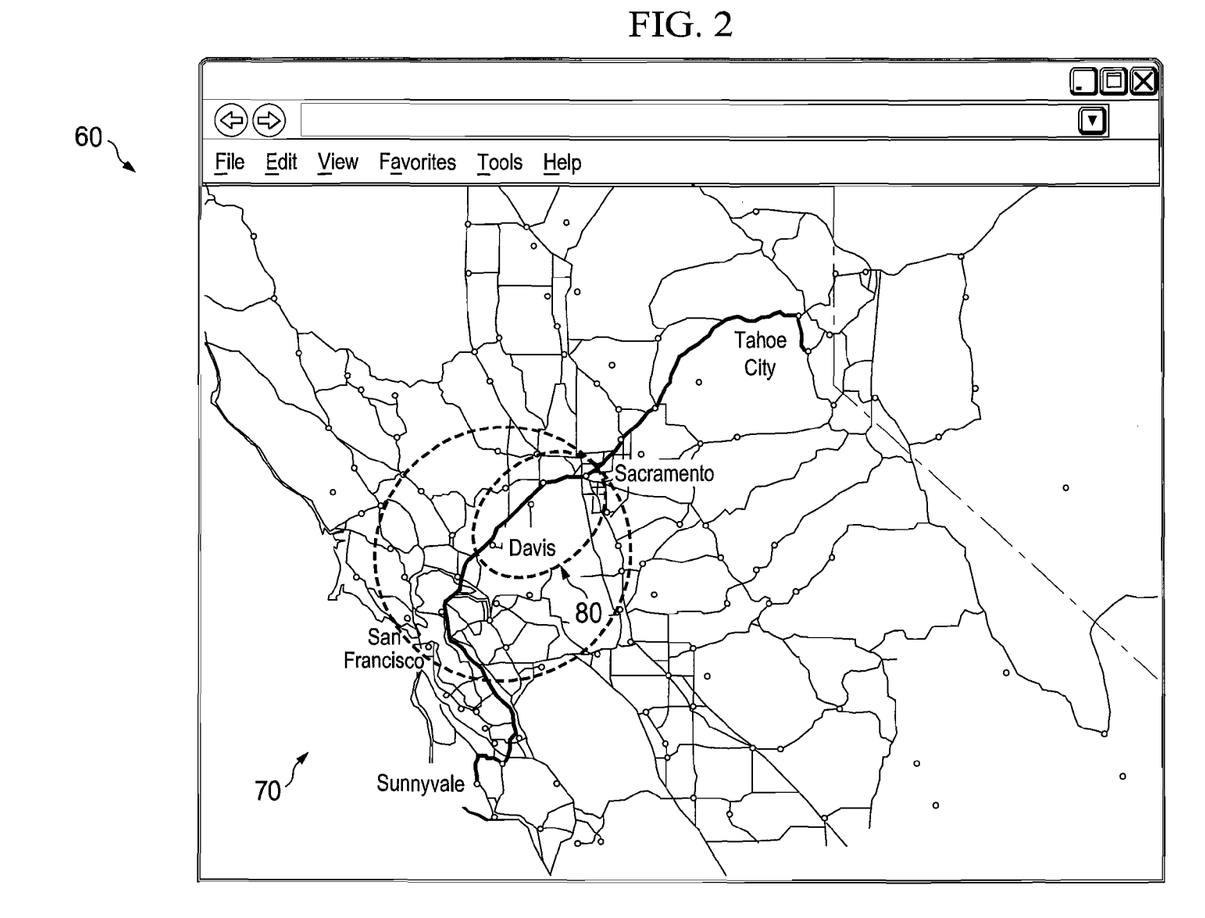
FIG. 2 is a simplified schematic diagram of a map image to be shown to an end user of the electric vehicle in accordance with one embodiment.

FIG. 2 is a simplified schematic diagram 60 of a mapping that may be accessed in conjunction with the aforementioned power management module 20. In this example, the access could be provided via personal computer 28, which can connect to service provider 14 via WAN 16. Please note that PC 28 and HEC 22 can be connected to WAN 16 directly (not shown in the example of FIG. 1) or via the electric meter WAN connection. In this example, the user seeks to make a trip in California and he will travel in a North Eastern direction (generally). For this trip, the planned power consumption depends on dynamic external factors (e.g., trip duration, weather, topography, traffic, etc.) and is, thus, less predictable. Information for all of these areas can be readily available on the web (e.g., at a given service provider) and, therefore, can be retrieved by power management module 20 and subsequently incorporated in an algorithm that analyzes the various options for an end user embarking on a planned trip Given that the previously mentioned factors typically have a small impact on the maximum distance the electric vehicle could travel, the system may suggest recharging locations (e.g., at 80% of the projected maximum distance the vehicle may be able to travel). In yet another embodiment in which power management module 20 is riding along in electric vehicle 18, power management module 20 can utilize an in-car navigation system (e.g., GPS), which is connected in this example wirelessly to the web. In one example implementation, system 10 can automatically and continuously update its distance estimate based on real-time changing conditions.

Example embodiments presented herein can not only offer a physical topography evaluation, but also provide a set of recommendations based on a time domain. FIG. 2 provides a sample display when the end user is planning a trip from Sunnyvale, Calif. to Tahoe city, Calif. Included in this illustration is a circular segment 70, which illustrates an example scope for possible destinations for recharging electric vehicle 18. In this instance, the system has identified and understood the current power level of electric vehicle 18, and potentially factored in traffic patterns, energy costs in the surrounding areas, and topography for this particular trip in order to offer a recommended sphere area 80 for recharging electric vehicle 18. In this instance, system 10 (e.g., through power management module 20) has identified that once the user left the Sunnyvale and San Francisco areas, energy prices are more affordable. This identification led to area 80 being recommended for recharging purposes. System 10 also had the intelligence to understand that the electric vehicle had enough power to make it to area 80 for charging purposes. This estimation could be conservative, which would properly account for unexpected deviations in weather or traffic patterns.

Additionally, system 10 is capable of suggesting an ideal time for recharging electric vehicle 18. If the end user in this particular instance were to indicate that he must travel during a certain time, then system 10 would be able to offer an intelligent suggestion for recharging electric vehicle 18 along his given route. It should also be noted that system 10 can certainly interface with various navigation tools (either handheld devices or tools configured in the vehicle) in order to identify upcoming fueling (recharging) stations for electric vehicle 18. This would further allow the end user to see (e.g., via his GPS tool) upcoming fueling stations, along with their current pricing (e.g., $0.05/watt).

In the case of an end user's house, system 10 can allow for a cost-effective interaction between various components. For example, if system 10 knows peak rates are in effect and the residence of the end user is about to use a high level of energy (e.g., starting the air-conditioning system on a particularly hot day), it can ask the end user for authorization to use X % of the electric vehicle's energy level to cool the house and save Y$ of electric charges.

Similarly, if an employer wants to use some of the electric vehicle's energy at noon to defer peak rates to run its operations (e.g., a datacenter), it can look at the end user's electric vehicle as a possible source of energy. In one example, system 10 can be configured to look at the end user's Outlook Calendar (or other similar Calendar tools), and if it sees the end user is not in need of the vehicle for some time, then the electric vehicle's battery could be used as an energy resource. For example, if an end user has local meetings until 5:00 PM, then the employer or the utility via the employer's system can probably safely withdrawal (or borrow) energy from the end user's vehicle. However, if system 10 sees impending driving obligations, the employer's power system would not remove energy from electric vehicle 18 and may, in some arrangements, fuel (recharge) electric vehicle 18.

In another alternative scenario, instead of letting the utility utilize energy from the vehicle's battery at random times (thus, potentially stranding an end user without an adequate charge to make an upcoming trip), any withdrawal may necessitate a permission from the end user, or the end user can allow only the house and/or an employer's energy management system to be permitted for such borrowing/recharging activities.

In other scenarios, utilities may give preferential treatment (and possibly lower energy costs) to users willing to let them use their vehicle batteries to mitigate peak load demand. In the case, where a utility company is not willing to pay for utilizing a customer's electric vehicle battery, it makes perfect sense for a user to use the V2G feature to reduce his own electricity bill. In accordance with another embodiment, the system may suggest that a user delay his trip, e.g., by an hour, so that the user arrives to the recharging station in Davis, Calif. after the ToU rate dropped, thus reducing the cost of recharging the car. In accordance with yet another embodiment, the system suggests that the user may want to spend some time shopping in the area between Davis and Sacramento, while his car is recharging. As such, the system can render targeted advertisement to the user from businesses located between Davis and Sacramento. The service provider may estimate the time required for charging the car and provide it to businesses that may be willing to bid for placing their advertisement on the display of FIG. 2.

Figure 3:
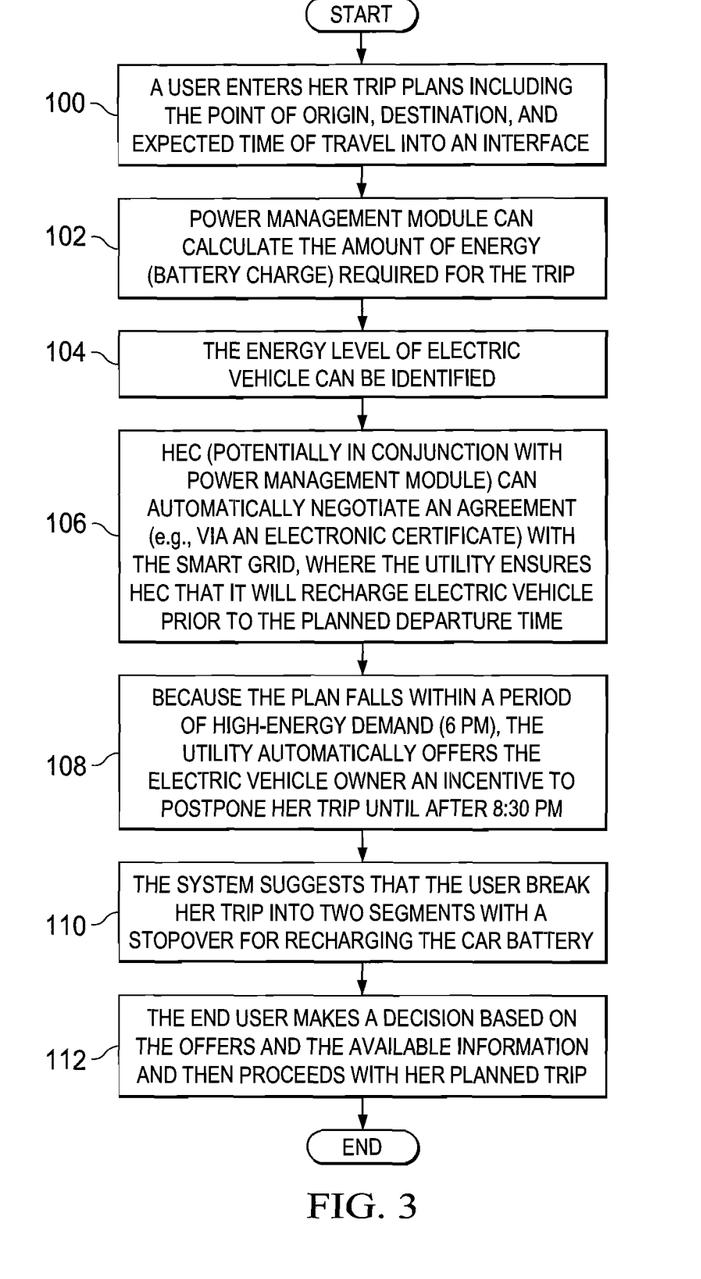
FIG. 3 is a simplified flowchart illustrating an example operational flow involving the system in accordance with one embodiment.

FIG. 3 is a simplified flowchart illustrating an example operational flow involving system 10 in accordance with one embodiment. In accordance with one example involving a plan for an upcoming trip, power management module 20 can interface with a trip-planning tool such as MapQuest, Google map, etc. This could occur in conjunction with operating a personal computer 28, which can access service provider 14. As part of managing and optimizing the transportation cost, a user can enter her trip plans including the point of origin, destination, and expected time of travel into an interface. This is shown as step 100. Power management module 20 can calculate the amount of energy (battery charge) required for the trip at step 102. In accordance with one specific embodiment, the system uses the topology of the terrain in order to calculate the energy required for the trip. For example, a trip up a hill may consume more energy than a trip over a flat terrain, while a downhill trip may actually charge the car's battery. This information can be displayed on personal computer 28, within HEC 22, or at electric vehicle 18 itself.

At step 104, the energy level of electric vehicle 18 can be identified. Unlike existing systems, where HEC 22 typically presents generic information about the energy available in the battery of electric vehicle 18, system 10 [in accordance with example embodiments] presents the available energy as a function of time. In case the utility wants to draw energy from electric vehicle 18 and reduce the charge of the battery below the energy required for the forthcoming planned trip, HEC 22 (potentially in conjunction with power management module 20) can automatically negotiate an agreement (e.g., via an electronic certificate) with the smart grid, where the utility ensures some entity (e.g., HEC 22) that it will recharge electric vehicle 18 prior to the planned departure time. This is illustrated as step 106. In accordance with another embodiment, HEC 22 may prohibit the utility from withdrawing power from electric vehicle 18 below a given level. For example, one predetermined level may coincide with an amount of energy level commensurate with a specific mileage (e.g., the distance to a nearby refueling station, or simply 5 miles, etc.). In other examples, the utility could be given a command that indicated electric vehicle 18 should always have a sufficient battery charge for a return trip back to the end user's home.

Continuing along with FIG. 3, the user has entered her plan for a trip starting at 6 PM, a week from today. For the utility, 6 PM falls within a period of high-energy demand. This time period represents an interval in which the utility could benefit from utilizing energy stored in the battery of the vehicle. As a result, the utility automatically offers the electric vehicle owner an incentive to postpone her trip until after, e.g., 8:30 PM. This is depicted at step 108. This would allow the utility to make use of the energy stored in the battery during the time it is most needed. The offer initiated by the utility could manifest itself with a simple display message (at either personal computer 28, an interface within electric vehicle 18, etc.) such as: "You can save $3.00 on your forthcoming trip by embarking before 3:30 PM or after 8:30 PM rather than at 6 PM."

In another example embodiment, the system may suggest that the user break her trip into two segments with a stopover for recharging the car battery. This is illustrated as step 110. If the user accepts this offer, the utility could provide the user with a battery charged to half of its capacity. Similarly, the user may want to break her trip and recharge her half-charged battery at 3 PM (when the ToU rate is low) to prevent the need for recharging the car at 6:00 PM during peak consumption when the rates are the highest. In yet another example scenario, the system may offer users to stop and charge their cars at a time when renewable energy (such as wind and solar) is readily available in order to reduce future recharging, which may need to take place when the intermittent renewable energy may not be readily available. The user may start driving at 6:30 PM [in this example scenario] and subsequently stop at 7:30 PM in order to charge the battery of the vehicle. Such an arrangement may fit well with end-user constraints (e.g., dinner plans, a movie, etc.). In conjunction with this embodiment, the user may be offered a discount for a restaurant along the selected route, where her car would be charged while she is having dinner. In accordance with yet another example scenario, the system may suggest that the user start her trip at 6:00 PM and stop for recharging in Sacramento at 8:30 PM, as the ToU rates at that non-peak consumption time would be lower. Step 112 merely depicts that the end user makes a decision based on the offers and on the available information and then proceeds with her planned trip.

At various times, travel plans may change and this may trigger a modification of the profile of energy the user may make available to the utility. Additionally, the modification of the starting time of the trip may affect the time the user needs to recharge her car and, as such, depending on the ToU rate at the charging time, the overall cost of the energy for the trip may be optimized. The better a utility can predict and plan future energy consumption, the more efficient and cost efficient its operation becomes. Therefore, there is an advantage for the utility to have users convey their travel plans (and as such their future energy requirements) to the utility well in advance. Users may alter their travel plans after they notified the utility of their travel plans. Such a modification can introduce variability in the virtual power generation, upon which the utility based its planning in order to satisfy the needs of its customers. In accordance with this embodiment, the utility can contract with selected users and outline a clause that discourages last minute changes in travel plans. For example, and in accordance with one specific contract, a user may modify her travel plans up until an hour before the planned trip takes place. However, if the user modifies her plans less than an hour before the trip takes place, she may be penalized for the last minute change. The penalty may be a reduction of the incentive she was getting from the utility for sharing her travel arrangements (and power) with electric grid control center 42 (which may be operating as a smart grid in this instance). Various other monetary penalties (inclusive of forfeiting benefits) may also be provided. In one general sense, this is a mechanism similar to the one in which travelers can cancel their hotel reservations up to three days in advance without any penalty. If they cancel the reservation one day in advance, they would still owe the hotel a half price fee, and if they cancel the reservation less than 24 hours before the trip, they would owe the full cost. Such a tiered system could readily operate in system 10. Such a business model for a utility factors in the time of use and, subsequently, rewards end users for predictable electricity consumption.

In accordance with another embodiment involving fleet management, HEC 22 manages a plurality of vehicles 18 associated with a household. The energy stored in the battery of each electric vehicle may be monitored by vehicle interface 24 (and/or power management module 20). Assume a scenario where a user enters a trip plan (e.g., go to the market in 15 minutes), and her vehicle battery does not have the required energy for the trip. Rather than starting the charge process during a high ToU rate period, the system first checks the available energy in the batteries of other associated cars belonging to the same household.

In case one of the other associated vehicles has sufficient energy, HEC 22 can notify the user accordingly (e.g., via a message such as: "You may use your husband's Toyota, which is charged."). This could defer charging of the initial vehicle until a suitable time, such as after 9 PM when a lower ToU rate will be in effect. This could save this particular end user several dollars in this particular example and such a savings could be displayed for the end user.

In certain example implementations, system 10 can achieve several potential advantages such as offering an analysis for trip planning and providing a trade-off between time flexibility and the associated costs of a trip involving electric vehicles. End users can be informed about the aforementioned trade-offs before making their decisions. Further, the architecture drives end user's behavior toward off-peak load electricity usage. In addition, the methodology can shift peak-load demand and, thereby, reduce the need for utilities to invest in new generation stations and transmission infrastructure. Moreover, certain examples can offer a new business method that incentivizes end users to plan their consumption [in advance] and to adhere to their plans. In more pragmatic terms, such an approach can reduce the variability and uncertainty of electricity demand planning and, more generally, minimize the cost of owning and operating an electric vehicle.

Software for calculating and/or suggesting an ideal arrangement for travel for an end user can be provided at various locations. In one example implementation, this software is provided in power management module 20, as described herein. This could include various communication interfaces for the transmission/reception of power data (and data related to pricing, traffic, weather, etc., as identified herein). In other examples, this power management module 20 could be provided in a proprietary element, which could be provided in (or proximate to) personal computer 28 (or any other device being used by a given end user in the management of power), or HEC 22, or vehicle interface 24, directly in electric vehicle 18, or be provisioned somewhere in the network. In another example, power management module 20 is provided in a server attached to a network (e.g., WAN 16) to perform the operations outlined herein.

As used herein in this Specification, the term 'power management module' is meant to encompass software, servers, processors, or any other suitable device, component, element, or object operable to exchange or process the information outlined herein. Moreover, power management module 20 may include any suitable hardware, software, components, modules, interfaces, or objects that facilitate the operations thereof. This may be inclusive of appropriate algorithms and communication protocols that allow for the effective exchange of data or information. In addition, as used herein, the term 'electric vehicle' can include any type of mobile vehicle: some of which could potentially utilize electric motors and/or motor controllers instead of a pure internal combustion engine (ICE) arrangement. This may include vehicles that employ a battery (or battery pack), which is carried on board the vehicle. Other energy storage methods may include the use of ultra-capacitors, or storage of energy in a spinning flywheel, or various other technologies for energy storage. Hybrid vehicles are certainly within the meaning of this term 'electric vehicle' as are motorcycles, scooters, mopeds, or any other vehicle that can operate with the assistance of an alternative fuel source.

Additionally, the term 'computer' as used herein in this Specification includes any type of personal digital assistant (PDA), a personal computer (PC), a laptop or electronic notebook, a cellular telephone, a GPS system, an onboard navigation system, an IP telephone with network capabilities, an I-Phone, or any other device, component, element, or object capable of initiating network data exchanges within a system.

In one example implementation, power management module 20 includes a processor, which executes code (e.g., software) for achieving some or all of the functionalities outlined herein [for example, determining optimal travel times, suggesting travel times, making calculations about when and where to recharge a battery, coordinating the withdrawal and return of energy, etc.]. In other embodiments, this feature may be provided external to power management module 20 or included in some other network device, or in a computer (e.g., personal computer 28, HEC 22, etc.) to achieve these intended functionalities. Alternatively, multiple elements (personal computer 28, HEC 22, power management module 20) can include this software (or reciprocating software) that can coordinate in order to achieve the processing or analyzing operations outlined herein. In still other embodiments, one, two, or all of these devices may include any suitable algorithms, hardware, software, components, modules, interfaces, or objects that facilitate the operations thereof.

Each of these elements (power management module 20, HEC 22, personal computer 28) can also include memory elements for storing information to be used in achieving the control and general processing mechanisms outlined herein. Additionally, each of these devices may include a processor that can execute software (e.g., logic) or an algorithm to perform the activities discussed in this Specification. These components may further keep information in any suitable memory element such as a random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs. While FIG. 1 shows electric meter element 26 as being associated with structure 12, it should be understood that electric meter element 26 can be associated with vehicle 18 or embedded in the cable used to attach vehicle 18 to structure 12, or distributed amongst these places in the network.

Note that with the examples provided herein, interaction may be described in terms of two, three, four, or more elements. However, this has been done for purposes of clarity and example only. In certain cases, it may be easier to describe one or more of the functionalities of a given set of flows by only referencing a limited number of components or elements. It should be appreciated that system 10 of FIG. 1 (and its teachings) are readily scalable. System 10 can accommodate a large number of components, as well as more complicated or sophisticated arrangements and configurations. Accordingly, the examples provided should not limit the scope or inhibit the broad teachings of system 10 as potentially applied to a myriad of other architectures.

It is also important to note that the steps described with reference to the preceding FIGURES illustrate only some of the possible scenarios that may be executed by, or within, system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the discussed concepts.

Numerous other changes, substitutions, variations, alterations, and modifications may be ascertained to one skilled in the art and it can be intended that the discussed concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a power management module configured to receive data associated with travel being proposed by an end user of an electric vehicle, wherein the power management module is configured to suggest a starting time for the travel based on time of use (ToU) rates for electricity consumption and a current level of power in the electric vehicle, wherein the power management module is further configured to interface with a utility in suggesting a different time for the travel.

2. The apparatus of claim 1, wherein the data associated with the travel includes a starting location, an ending location, and a proposed drive time.

3. The apparatus of claim 1, wherein the power management module is further configured to interface with a mapping tool in suggesting the starting time for the end user.

4. The apparatus of claim 1, wherein the power management module is configured to obtain the ToU rates from a utility, and the ToU rates are provided as a function of time.

5. The apparatus of claim 1, wherein the power management module is further configured to identify at least one potential charging station for the electric vehicle to use during the travel.

6. The apparatus of claim 1, wherein the power management module uses at least one additional factor for suggesting the starting time, the factor being selected from a group of factors consisting of:
 a) topography associated with the travel;
 b) traffic patterns associated with the travel; and
 c) weather conditions associated with the travel.

7. The apparatus of claim 1, wherein the power management module is further configured to identify a geographical area for the travel of the end user, the identification of the geographical area being used for delivery of one or more advertisements to the end user for one or more business entities in the geographic area.

8. The apparatus of claim 1, wherein the power management module is further configured to interface with a home energy controller in order to transfer power to and from the electric vehicle via a residence associated with the end user, and wherein the power management module is further configured to interface with the home energy controller in order to borrow or return power between multiple electric vehicles.

9. The apparatus of claim 1, wherein the power management module is further configured to interface with a calendar tool associated with the end user and to coordinate a transfer of power to or from the electric vehicle based on information within the calendar tool.

10. The apparatus of claim 1, wherein the suggestion of the different time results in a discounted energy rate for the end user.

11. The apparatus of claim 10, wherein a portion of the discounted energy rate for the end user is forfeited if the end user commits to the different time and subsequently departs from the suggested different time.

12. A method, comprising:
 receiving data associated with travel being proposed by an end user of an electric vehicle;
 suggesting by a processor a starting time for the travel based on time of use (ToU) rates for electricity consumption and a current level of power in the electric vehicle; and
 interfacing with a utility in suggesting a different time for the travel.

13. The method of claim 12, wherein the data associated with the travel includes a starting location, an ending location, and a proposed drive time.

14. The method of claim 12, wherein the suggesting further includes interfacing with a mapping tool in order to identify an associated geographic area for the travel for the end user.

15. The method of claim 12, wherein the ToU rates are provided as a function of time, and wherein the suggesting further includes identifying at least one potential charging station for the electric vehicle to use during the travel.

16. The method of claim 12, further comprising:
 identifying a geographical area for the travel of the end user, the identification of the geographical area being used for delivery of one or more advertisements to the end user for one or more business entities in the geographic area.

17. The method of claim 12, further comprising:
 interfacing with a calendar tool associated with the end user in order to coordinate a transfer of power to or from the electric vehicle based on information within the calendar tool.

18. The method of claim 12,
 wherein the suggestion of the different time results in a discounted energy rate for the end user, and wherein a portion of the discounted energy rate for the end user is forfeited if the end user commits to the different time and subsequently departs from the suggested different time.

19. A system, comprising:
 means for receiving data associated with travel being proposed by an end user of an electric vehicle;
 means for suggesting a starting time for the travel based on time of use (ToU) rates for electricity consumption and a current level of power in the electric vehicle; and
 means for interfacing with a utility in suggesting a different time for the travel.

20. The system of claim 19, wherein the data associated with the travel includes a starting location, an ending location, and a proposed drive time, and wherein the means for suggesting the starting time is further configured to interface with a mapping tool in suggesting the starting time for the end user.

21. The system of claim 19, further comprising:
 means for identifying a geographical area for the travel of the end user, the identification of the geographical area being used for delivery of one or more advertisements to the end user for one or more business entities in the geographic area.

22. The system of claim 19, further comprising:
 means for interfacing with a calendar tool associated with the end user in order to coordinate a transfer of power to or from the electric vehicle based on information within the calendar tool.

23. The system of claim 19,
 wherein the suggestion of the different time results in a discounted energy rate for the end user, and wherein a portion of the discounted energy rate for the end user is forfeited if the end user commits to the different time and subsequently departs from the suggested different time.

24. Logic encoded in non-transitory media for execution and when executed by a processor is operable to:
 receive data associated with travel being proposed by an end user of an electric vehicle;
 suggest a starting time for the travel based on time of use (ToU) rates for electricity consumption and a current level of power in the electric vehicle; and
 interface with a utility in suggesting a different time for the travel.

25. The logic of claim 24, wherein the data associated with the travel includes a starting location, an ending location, and a proposed drive time.

26. The logic of claim 24, wherein the code is further operable to interface with a mapping tool in order to identify an associated geographic area for the travel for the end user.

27. The logic of claim 24, wherein the ToU rates are provided as a function of time, and wherein the code is further operable to identify at least one potential charging station for the electric vehicle to use during the travel.

28. The logic of claim 24, wherein the code is further operable to identify a geographical area for the travel of the end user, the identification of the geographical area being used for delivery of one or more advertisements to the end user for one or more business entities in the geographic area.

* * * * *